(12) United States Patent
Kim et al.

(10) Patent No.: US 9,842,666 B2
(45) Date of Patent: Dec. 12, 2017

(54) CARBON NANOFIBER INCLUDING COPPER PARTICLES, NANOPARTICLES, DISPERSED SOLUTION AND PREPARATION METHODS THEREOF

(75) Inventors: Il Doo Kim, Seoul (KR); Yong-Won Song, Daejeon (KR); Jae-Min Hong, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 1029 days.

(21) Appl. No.: 13/279,712

(22) Filed: Oct. 24, 2011

(65) Prior Publication Data
US 2012/0100303 A1   Apr. 26, 2012

(30) Foreign Application Priority Data

Oct. 26, 2010 (KR) .................. 10-2010-0104912

(51) Int. Cl.
*B82Y 30/00* (2011.01)
*H01B 1/02* (2006.01)
(Continued)

(52) U.S. Cl.
CPC .............. *H01B 1/026* (2013.01); *B82Y 30/00* (2013.01); *B82Y 40/00* (2013.01); *C09D 11/52* (2013.01);
(Continued)

(58) Field of Classification Search
CPC ......... B82Y 30/00; B82Y 40/00; C09D 11/52; D01D 5/0007; D01F 5/0007; D01F 1/10; D01F 9/14; H01B 1/026; H01B 1/16; Y10T 428/2918

USPC ....... 977/700, 742, 745, 748, 749, 750, 752, 977/773, 778, 810; 106/31.92; 252/503; 264/8; 427/553; 428/367
See application file for complete search history.

(56) References Cited

U.S. PATENT DOCUMENTS 5,916,642 A * 6/1999 Chang ............................ 29/509
7,538,062 B1 * 5/2009 Dai et al. ...................... 502/185
(Continued)

FOREIGN PATENT DOCUMENTS

| KR | 1020090079086 A | 7/2009 |
| KR | 1020110028152 A | 3/2011 |
| KR | 1020110072805 A | 6/2011 |

OTHER PUBLICATIONS

Korea Office Action dated Sep. 6, 2012; Appln. No. 10-2010-0104912.
(Continued)

*Primary Examiner* — Arti Singh-Pandey
(74) *Attorney, Agent, or Firm* — Ladas & Parry LLP (57) ABSTRACT

Disclosed are amorphous carbon nanofibers including copper nanoparticles or copper alloy nanoparticles, copper composite nanoparticles prepared by grinding the amorphous carbon nanofibers and implemented as surfaces of Cu-included particles are partially or wholly coated with amorphous carbons, a dispersed solution including the copper composite nanoparticles, and preparation methods thereof and the amorphous carbon nanofibers include nanoparticles including copper, copper nanoparticles or copper alloy nanoparticles, and, the copper composite nanoparticles are implemented as surfaces of Cu-included particles are partially or wholly coated with amorphous carbons.

10 Claims, 7 Drawing Sheets

(51) Int. Cl.

| | | |
|---|---|---|
| *B82Y 40/00* | (2011.01) | |
| *D01D 5/00* | (2006.01) | |
| *D01F 1/10* | (2006.01) | |
| *D01F 9/14* | (2006.01) | |
| *H01B 1/16* | (2006.01) | |
| *C09D 11/52* | (2014.01) | |

(52) U.S. Cl.
CPC ............ *D01D 5/0007* (2013.01); *D01F 1/10* (2013.01); *D01F 9/14* (2013.01); *H01B 1/16* (2013.01); *Y10T 428/2918* (2015.01)

(56) References Cited

U.S. PATENT DOCUMENTS

| | | | |
|---|---|---|---|
| 8,278,010 B2* | 10/2012 | Kim | 429/523 |
| 2003/0148097 A1 | 8/2003 | Takikawa et al. | |
| 2007/0237990 A1* | 10/2007 | Kim | 429/12 |
| 2009/0227162 A1* | 9/2009 | Kruckenberg et al. | 442/1 |
| 2011/0151255 A1* | 6/2011 | Kim | B82Y 30/00 428/372 |
| 2012/0027934 A1* | 2/2012 | Lee et al. | 427/217 |
| 2012/0100303 A1* | 4/2012 | Kim et al. | 427/553 |
| 2012/0183770 A1* | 7/2012 | Bosnyak et al. | 428/367 |
| 2012/0295108 A1* | 11/2012 | Nishi et al. | 428/368 |

OTHER PUBLICATIONS

Korean Notice of Allowance dated Aug. 30, 2013; Appln. No. 10-2010-0104912.

\* cited by examiner

FIG. 14

CARBON NANOFIBER INCLUDING COPPER PARTICLES, NANOPARTICLES, DISPERSED SOLUTION AND PREPARATION METHODS THEREOF

CROSS-REFERENCE TO RELATED APPLICATION

Pursuant to 35 U.S.C. §119(a), this application claims the benefit of earlier filing date and right of priority to Korean Application No. 10-2010-0104912, filed on Oct. 26, 2010, the contents of which is incorporated by reference herein in its entirety.

BACKGROUND OF THE INVENTION

1. Field of the Invention

This specification relates to amorphous carbon nanofibers and copper composite nanoparticles. The amorphous carbon nanofibers are including nanoparticles which is including copper component, and the nanoparticles including copper component may be copper nanoparticles or copper alloy nanoparticles. The copper composite nanoparticles, whose surfaces of the nanoparticles including copper component are partially or wholly coated with amorphous carbons, are prepared by grinding the amorphous carbon nanofibers.

This specification relates to a dispersed solution including the copper composite nanoparticles, and preparation methods thereof.

The copper composite nanoparticles may be used to form a thin film on a substrate by printing, and may be used as a functional ink material.

2. Background of the Invention

Recently, a printed electronics industry based on printing technology for producing electronic devices with a thin thickness and low costs has been attracted much attention. Printed electronics technology is used to form a thin film by printing a functional ink material on a substrate, and to prepare various types of electronic devices therefrom. This printed electronics technology is suitable for producing electronic products such as flat or flexible displays, organic solar cells/semiconductor devices, memory devices and next generation mobile IT devices and energy storing and/or generating devices including thin film Li-secondary batteries.

In order to prepare printed electronics devices using a printing processing technique on a plastic substrate, functional nano ink having an excellent dispersion property has to be prepared. Especially, conductive ink utilized for wirings and patterns printed on a circuit board is required to have a uniform particle size and an excellent dispersion property. Since the plastic substrate is easily deformed even at a low temperature, a high-temperature thermal treatment cannot be performed. Accordingly, a basic conductivity of nano ink has to be high enough for an excellent conductivity even by a low-temperature thermal treatment. As a general conductive ink, silver, copper, alloy thereof, carbon nanotube, etc. are being widely used. So far, silver having a high oxidation stability and capable of easily synthesizing nanoparticles is being used the most widely. And, copper ink is also being developed actively for low costs of ink. However, the copper is easily oxidized in the air. Accordingly, required is developing copper ink having high reliability, the copper ink capable of minimizing oxidation of copper particles and having a high electrical conductivity after a printing process.

In order to prepare nanoparticles having a size less than 50 nm, nanoparticles are formed from a metal salt solution in a bottom-up manner. This method is advantageous in that nanoparticles can be directly prepared into solution ink due to a synthesis in a colloid solution. Alternatively, nanoparticles are prepared by grinding bulk powder in a top-down manner. In this case, it is difficult to grind the bulk powder in a size less than 50 nm, and many mechanical stresses are introduced into particles during a grinding process. This may lower unique features and functions of the nanoparticles. However the top-down method is more advantageous in the aspect of massive productions. Accordingly, required is a novel processing capable of minimizing introduction of stresses into particles during a grinding process, and capable of massively preparing copper nanoparticles and copper alloy nanoparticles.

Furthermore, the conventional copper particles have surfaces oxidized by oxygen, thereby having a shape that a thin film such as $CuO$ or $Cu_2O$ encompasses the copper particles. This oxide film greatly degrades an electrical conductivity of the copper particles. Accordingly, it is important to prepare nanoparticles capable of minimizing oxidation of copper particles.

SUMMARY OF THE INVENTION

Therefore, an aspect of the detailed description is to provide nanoparticles having an excellent conductivity even by a low-temperature thermal treatment, having a uniform particle size and including cheap copper capable of minimizing oxidation, and nano ink where the nanoparticles are dispersed with an excellent disperse property.

Another aspect of the detailed description is to provide a method capable of massively preparing copper nanoparticles and/or copper alloy nanoparticles embedded in amorphous carbon nanofibers, copper nanoparticles and/or copper alloy nanoparticles coated by very thin carbon shells, and a dispersed solution of the copper composite nanoparticles with low costs.

To achieve these and other advantages and in accordance with the purpose of this specification, as embodied and broadly described herein, there are provided amorphous carbon nanofibers including nanoparticles including copper component, and the nanoparticles including copper component may be copper nanoparticles or copper alloy nanoparticles. There are provided copper composite nanoparticles, wherein surfaces of nanoparticles including copper component are partially or wholly coated with amorphous carbons, and a dispersed solution of the copper composite nanoparticles that the nanoparticles are uniformly dispersed in a solvent.

To achieve these and other advantages and in accordance with the purpose of this specification, as embodied and broadly described herein, there is also provided a method for preparing amorphous carbon nanofibers including copper nanoparticles, the method comprising: (a) dissolving a polymer and a copper precursor in a solvent, thereby forming a spinning solution; (b) spinning the spinning solution, thereby forming composite nanofibers including the polymer and the copper precursor; and (c) forming amorphous carbon nanofibers including copper nanoparticles by thermal treatment the composite nanofibers, wherein the thermal treatment includes carbonizing the polymer, and forming copper nanoparticles through copper nucleation from the copper precursor and copper particle growth. Alternatively, the amorphous carbon nanofibers including copper alloy nanoparticles may be formed by additionally dissolving a metal precursor or a metal salt precursor in the spinning solution.

To achieve these and other advantages and in accordance with the purpose of this specification, as embodied and broadly described herein, there is still also provided a method for preparing a dispersed solution of copper composite nanoparticles by grinding the amorphous carbon nanofibers including copper nanoparticles or copper alloy nanoparticles in a solvent into an ultrafine size, wherein copper composite nanoparticles are uniformly dispersed in the solvent without being precipitated and clustered, and the copper composite nanoparticles are copper or copper alloy nanoparticles whose surfaces are partially or wholly coated with amorphous carbons.

To achieve these and other advantages and in accordance with the purpose of this specification, as embodied and broadly described herein, there is yet still also provided a method for preparing copper composite nanoparticles, wherein copper composite nanoparticles are prepared by separating the copper composite nanoparticles from the dispersed solution of the copper composite nanoparticles, and then by drying the separated copper composite nanoparticles.

The present invention may have the following advantages.

Firstly, the copper composite nanoparticles may be implemented by partially or wholly coating surfaces of nanoparticles including copper component with amorphous carbons. This may minimize a clustering phenomenon occurring between copper particles.

Secondly, the amorphous carbon nanofibers including the nanoparticles including copper component, which are copper nanoparticles and/or copper alloy nanoparticles, may be wet-ground in a solvent into an ultrafine size. Accordingly, the nanoparticles including copper component, having surfaces partially or wholly coated with amorphous carbons, may have an excellent dispersion property in a dispersion solution. This may also minimize oxidation of the copper particles by oxygen during a handling process.

Thirdly, the present invention may provide a method for preparing amorphous carbon nanofibers including copper nanoparticles or copper alloy nanoparticles, or a porous carbon nanofiber. This may provide a massive production method capable of minimizing oxidation of copper by coating of amorphous carbons, and capable of easily controlling a size of nanoparticles. Especially, the amorphous carbon nanofibers including the nanoparticles including copper component, which are copper nanoparticles or copper alloy nanoparticles, may be wet-ground by a microbead milling machine, thereby preparing a dispersed solution including copper nanoparticles or copper alloy nanoparticles having an excellent crystalline property. This may enable copper, copper alloy nanoparticles, and nano ink to be prepared therefrom thus to be utilized as nano ink and nano powder for an ink-jet printing process or other coating processes.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

The term of copper composite nanoparticles means that nanoparticles including copper component whose surfaces are partially or wholly coated with amorphous carbons, unless stated otherwise.

Amorphous carbon nanofibers according to the present invention include copper nanoparticles or copper alloy nanoparticles. Here, the nanoparticles composed of only copper composition may be copper nanoparticles, or copper alloy nanoparticles where copper is mixed with other metals. The copper alloy (representing an alloy of copper and other metals in the present invention) may be an alloy of copper and a metal having a higher melting point than the copper, i.e., $Cu_{1-x}M_x$. Here, the 'M' may indicate one or more metals selected from a group consisting of Ni, Cr, Co, Fe, W and Ti, and the 'X' may be in the range of 0.01~20. For instance, the alloy may be implemented as $Cu_{1-x}Ni_x$, $Cu_{1-x}Cr_x$, $Cu_{1-x}Co_x$, $Cu_{1-x}Fe_x$, $Cu_{1-x}W_x$, $Cu_{1-x}Ti_x$, etc., or may be an alloy including a plurality of metals among the Ni, Cr, Co, W, Ti and Fe. The 'X' may be in the range of 0.01~20, i.e., a metal has an amount of 20 mol % or less. When the alloy includes a plurality of metals rather than copper, a total amount of other metals rather than copper is 20 mol % or less.

When a metal precursor or a metal salt precursor having a higher melting point than copper is spun and thermally processed during a preparation process, a nucleation process of copper particles may be influenced by a high melting point of the metal. And, nanoparticles having a smaller particle size than pure copper nanoparticle may be prepared. If a copper alloy has an amount more than 20 mol %, a high electrical conductivity of copper may be degraded, and an advantage of the copper, low costs may not be implemented. Therefore, in a $Cu_xM_{1-x}$ alloy having a higher melting point than copper, the 'X' may be preferably in the range of 0~20 mol %.

The nanoparticles including copper may have a size of 2~100 nm, the amorphous carbon nanofibers may be porous amorphous carbon nanofibers having pores of 1~100 nm, and the amorphous carbon nanofibers may have a diameter of 50~3000 nm.

The copper composite nanoparticles of the present invention are implemented as surfaces of copper nanoparticles or copper alloy nanoparticles are partially or wholly coated with amorphous carbons. Here, the copper composite nanoparticles may have a size of 2~100 nm, and the copper alloy nanoparticles may be $Cu_{1-x}M_x$ copper alloy nanoparticles ('M' is one or more metals selected from a group consisting of Ni, Cr, Co, Fe, W and Ti, and the 'X' is in the range of 0.01~20). The copper composite nanoparticles may be prepared by wet-grinding the amorphous carbon nanofibers including copper nanoparticles or copper alloy nanoparticles of the present invention.

The dispersed solution of the copper composite nanoparticles of the present invention may be implemented as the nanoparticles of the present invention are uniformly dispersed in a solvent without being precipitated and clustered.

A method for preparing amorphous carbon nanofibers including copper nanoparticles of the present invention comprises (a) dissolving a polymer and a copper precursor in a solvent, thereby forming a spinning solution, (b) electrospinning the spinning solution, thereby forming composite nanofibers including the polymer and the copper precursor, and (c) forming amorphous carbon nanofibers including copper nanoparticles by thermal treatment of the composite nanofibers, wherein the thermal treatment includes carbonizing the polymer, and forming copper nanoparticles through copper nucleation from the copper precursor and copper particle growth. Alternatively, the method for preparing amorphous carbon nanofibers including copper alloy nanoparticles of the present invention comprises (a) dissolving a polymer, a copper precursor, and a metal or metal salt precursor in a solvent, thereby forming a spinning solution, (b) electrospinning the spinning solution, thereby forming composite nanofibers including the polymer, the copper precursor, and the metal or metal salt precursor, and (c) forming amorphous carbon nanofibers including copper alloy nanoparticles by thermal treatment of the composite nanofibers, wherein the thermal treatment includes carbonizing the polymer, and forming copper alloy nanoparticles through nucleation from the copper alloy precursor including metal or metal salt precursor, and nanoparticle growth.

Carbon particles may be additionally dispersed in the spinning solution of step (a) such that the composite nanofibers of step (b) further include the carbon particles. And, the carbon particles may be decomposed in the thermal process of step (c) such that carbon nanofibers include pores of 1~100 nm.

The copper precursor may be one or more selected from a group consisting of Copper(II) sulfate ($CuSO_4$), Copper (II) sulfate pentahydrate ($CuSO_4.5H_2O$), Copper(II) sulfate hydrate ($CuSO_4.xH_2O$), Copper(II) acetate monohydrate ($Cu(CO_2CH_3)_2.H_2O$), Copper(II) acetate hydrate ($Cu(CO_2CH_3)_2.xH_2O$), Copper(II) acetylacetonate ($Cu(C_5H_7O_2)_2$), Copper(I) chloride (CuCl), Copper(II) chloride dehydrate ($CuCl_2.2H_2O$), copper(II) methoxide ($Cu(OCH_2)_2$), Copper(II) nitrate hydrate ($Cu(NO_3)_2.xH_2O$) and Copper(II) nitrate ($Cu(NO_3)_2$). Alternatively, the metal or metal salt precursor may be one or more selected from a group consisting of Ni, Cr, Co, Fe, W and Ti.

The thermal treatment for formation of copper nanoparticles or copper alloy nanoparticles and for polymer carbonization may be performed at a reduction atmosphere of 450~700° C.

In step of forming the spinning solution, the polymer may be one or more selected from a group consisting of a polyurethane copolymer including polyvinyl acetate, polyurethane or polyetherurethane, a cellulose derivative such as cellulose acetate, cellulose acetate butylate and cellulose acetate propionate, polymethyl methacrylate (PMMA), polymethyl acrylate (PMA), a polyacrylic copolymer, a polyvinyl acetate copolymer, polyvinyl alcohol (PVA), polyfufuryl alcohol (PPFA), polysterene (PS), a polysterene copolymer, polyethylene oxide (PEO), polypropylene oxide (PPO), a polyethylene oxide copolymer, a polypropylene oxide copolymer, polycarbonate (PC), polyvinylchloride (PVC), polycaprolactone, polyvinylpyrrolidone (PVP), polyvinylfluoride, a polyvinylfluoride copolymer and polyamide. In case of mixing two or more polymers with each other, each polymer has an amount of 30~70 wt. %.

The carbon particles added to make the amorphous carbon nanofibers into porous carbon nanofibers including a plurality of pores may be one or more fine carbon powders selected from a group consisting of carbon black, acetylene black, denka black, super-P and ketjen black.

The method for preparing a dispersed solution of copper composite nanoparticles of the present invention is to prepare a dispersed solution by grinding the amorphous carbon nanofibers including nanoparticles including copper component in a solvent into an ultrafine size, wherein copper composite nanoparticles are uniformly dispersed in the solvent without being precipitated and clustered, and the copper composite nanoparticles are the nanoparticles including copper component whose surfaces are partially or wholly coated with amorphous carbons. And, the method for preparing copper composite nanoparticles is to prepare copper composite nanoparticles by separating the copper composite nanoparticles from the dispersed solution including the copper composite nanoparticles, and then by drying the separated copper composite nanoparticles.

The prepared copper composite nanoparticles may be used to prepare nano ink including copper composite nanoparticles, or may be used to prepare a functional thin film on a substrate. Alternatively, the prepared copper composite nanoparticles may undergo an optical sintering such as laser-sintering process or IPL (intense pulsed light) sintering to have amorphous carbons removed from surfaces thereof, thereby being used to form a pure copper thin film or a pure copper alloy thin film without carbon residues.

Hereinafter, each method for preparing amorphous carbon nanofibers, copper composite nanoparticles and a dispersed solution thereof will be explained in more details.

Firstly, a spinning solution having an appropriate viscosity optimized for electrospinning process is prepared by dissolving copper precursors or copper alloy precursors alloy (e.g., copper and nickel) and a polymer.

An electrospinning suspension serving as the spinning solution may be prepared by dissolving a polymer and a copper precursor or copper-metal salt precursor in a polarity solvent such as water, ethanol, THF (Tetrahydrofuran), DMF (Dimethylformamide) and DMAc (Dimethylacetamide). Preferably, a mixed solution of a polymer and a copper precursor or copper-metal salt precursor (the metal salt precursor may be referred to as a metal precursor in the present invention), i.e., the electrospinning solution has a viscosity suitable for forming nanofibers during an electrospinning process. As the polymer, thermosetting and thermoplastic resins may be used.

A nickel precursor used to prepare amorphous carbon nanofibers including copper alloy nanoparticles composed of mixed alloy of copper and nickel may be one selected from a group consisting of Nickel(II) acetate tetrahydrate ($Ni(OCOCH_3)_2.4H_2O$), Nickel(II) acetylacetonate ($Ni(C_5H_7O_2)_2$), Nickel(II) chloride ($NiCl_2$), Nickel(II) chloride hexahydrate ($NiCl_2.6H_2O$), Nickel(II) chloride hydrate ($NiCl_2.xH_2O$) and Nickel(II) nitrate hexahydrate ($Ni(NO_3)_2.6H_2O$), or a mixture salt therebetween.

Rather than Ni, any metal such as Cr, Co, W, Ti and Fe having a higher melting point than copper may be used. A copper alloy preferably has an amount not more than 20 mol %. If the copper alloy has an amount more than 20 mol %, a high electrical conductivity of copper may be degraded, and an advantage of the copper, low costs may not be implemented. Therefore, in a $Cu_xM_{1-x}$ alloy, the 'M' may include any metal having a higher melting point than copper. Preferably, the 'X' may be in the range of 0~20 mol %. When a plurality of metals rather than copper are used, a total amount of the metals may be less than 20 mol %.

When a copper precursor and a metal salt precursor having a higher melting point than the copper are spun and thermally processed, a nucleation and grain growth process of copper particles may be influenced by a high melting point of the alloy metals. Thus, nanoparticles having a smaller particle size than pure copper may be prepared.

In the spinning solution, the polymer preferably has an amount of 5~15 wt. % based on a solvent. If the polymer has a very small amount less than 5 wt. %, it is difficult to maintain a nano-fibrous shape. On the other hand, if the polymer has a very large amount more than 15 wt. %, a spinning process is not smoothly performed due to a high viscosity.

In the spinning solution, any one selected from a copper, a copper precursor, a metal, a metal-salt precursor and combinations thereof preferably has an amount of 5~30 wt. % based on a solvent. If the one selected from the copper, the copper precursor, the metal, the metal-salt precursor and combinations thereof has a very small amount less than 5 wt. % in the spinning solution, the amount of copper particles formed in amorphous carbon nanofibers after a thermal treatment may be small. On the other hand, if the one selected from the copper, the copper precursor, the metal, the metal-salt precursor and combinations thereof has a very large amount more than 30 wt. %, a spinning solution may not be well formed due to a saturation, and a precipitation may be observed when preparing a spinning solution. This precipitation material may serve as impurities blocking a hole of a needle (tip) during a spinning process.

The amount of the polymer and the metal salt precursor may be greatly variable according to types of a polymer and a precursor to be used. If a spinnable polymer and a spinnable metal salt precursor are combined with each other, the amount is not limited to a specific value.

Next, the spinning solution may be electrospun to prepare composite nanofibers as copper precursor-polymer composite nanofibers, or copper precursor-metal salt precursor-polymer composite nanofibers.

If carbon particles are additionally dispersed in the dispersed solution, composite nanofibers which are copper precursor-carbon particles-polymer or copper precursor-metal salt precursor-carbon particles-polymer composite nanofibers may be prepared through a spinning process. The carbon particles included in the composite nanofibers are decomposed during a thermal treatment such that carbon nanofibers include pores having a size of 1~100 nm so as to form porous carbon nanofibers. At the same time, carbon which constitutes the carbon particles is decomposed to be combined with oxygen in the form of $CO_2$. This may restrain introduction of oxygen, thereby preventing formation of copper-oxide and preparing nanoparticles including pure copper.

These composite nanofibers are thermally processed to prepare amorphous carbon nanofibers including copper nanoparticles or copper alloy nanoparticles.

The amorphous carbon nanofibers including the nanoparticles including copper component, which are copper nanoparticles or copper alloy nanoparticles, are wet-ground into an ultrafine size, thereby preparing copper composite nanoparticles where surfaces of copper nanoparticles or copper alloy nanoparticles in them are partially or wholly coated with amorphous carbons.

The wet-grinding process may be performed by using a zirconia ball having a size of 0.015~0.1 mm. Here, when the ball (microbead) has a size of 0.015 mm, copper composite nanoparticles with higher loading concentration and uniform particle size distribution may be prepared. On the other hand, when the ball (microbead) has a size more than 0.1 mm, the amount of nanoparticles having a size more than 50 nm is increased.

The size of nanoparticles inside the dispersed solution may be variable according to a grinding time. More concretely, as a grinding time is long, the size of the nanoparticles is decreased. Preferably, a microbead milling process is performed for one minute~one hour. If a microbead milling time is more than one hour, excessive stains are applied to copper composite nanoparticles to greatly lower an electric characteristic of obtained nanoparticles.

A solvent used during the wet-grinding process may be selected from a group consisting of ethanol, methanol, propanol, butanol, isopropyl alcohol (IPA), tetra hydrofuran, N,N-dimethylformamide, N,N-dimethylacetamide, N-methylpyrrolidone, acetnitril, toluene, chloroform, methylenechloride, benzene, xylene and water, or a mixture solution thereof. Here, the solvent is not limited to a specific solvent.

Through the wet-grinding process (microbead milling), may be prepared a dispersed solution where copper composite nanoparticles having surfaces partially or wholly coated with amorphous carbons. That is, may be prepared a dispersed solution where copper composite nanoparticles are uniformly dispersed in a solvent without being precipitated and clustered. Here, the copper composite nanoparticles are implemented as surfaces of copper nanoparticles or copper alloy nanoparticles are partially or wholly coated with amorphous carbons.

Since the copper composite nanoparticles have been prepared by grinding carbon nanofibers including nanoparticles including copper component, a clustering phenomenon between copper nanoparticles or copper alloy nanoparticles occurs less than in a case where nanoparticles consisting of pure copper are ground. Furthermore, formation of an oxide film (copper-oxide) during the preparation process may be minimized by the formation of very thin amorphous carbon shells which partially or wholly coat surfaces of copper nanoparticles or copper alloy nanoparticles.

EXAMPLES

Hereinafter, the present invention will be explained in more details through several examples. However, these examples are merely illustrative, and the present invention is not limited to these.

Example 1: Preparation of Amorphous Carbon Nanofibers Including Copper Nanoparticles Firstly, 1 g of a copper precursor, $CuSO_4.4H_2O$ was put in a solvent, 8 g of DMF inside 100 ml of a flask, thereby preparing a solution where the copper precursor is dissolved. Then, 1 g of polyvinylpyrrolidone (PVP, Mw=1,300,000) was added to the resultant, thereby preparing a spinning solution. This spinning solution serves as a copper precursor-polymer composite spinning solution. This copper precursor-polymer composite spinning solution was put in 20 ml of a syringe, and then was discharged through a needle (30 G) at a speed of 10 µl/min. A voltage difference for spinning was in the range of 13~25 kV. As a collector, a metallic substrate formed of stainless steel (SUS) was used. Through control of a discharge amount, a thickness of a composite fibrous layer (web) was controlled. The composite nanofibers prepared after the spinning process were thermally heat-treated (calcined) at a reduction atmosphere (a mixture gas of 20% hydrogen and 80% nitrogen). The thermal treatment was performed at a temperature of 550° C. for 60 minutes.

Figure 1:
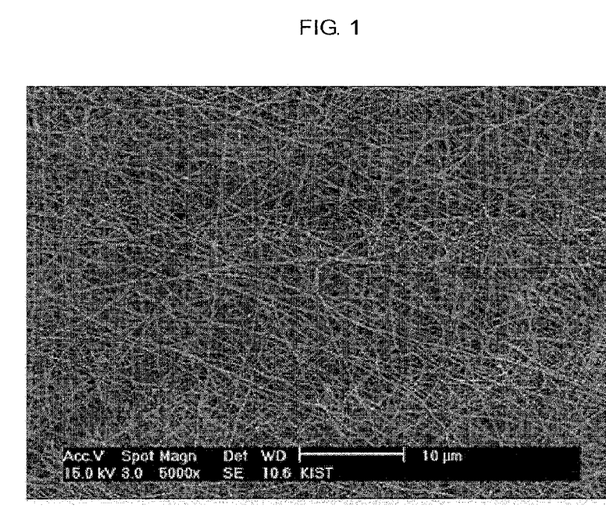
FIG. 1 is a scanning electron microscopy (SEM) image of amorphous carbon nanofibers including copper nanoparticles of a first example.

FIG. 1 shows a scanning electron microscopy (SEM) image of amorphous carbon nanofibers including copper nanoparticles of the first example. As shown in FIG. 1, carbon nanofibers having a diameter of 100~300 nm were well formed. These carbon nanofibers are entangled with each other in a web shape.

Figure 2:
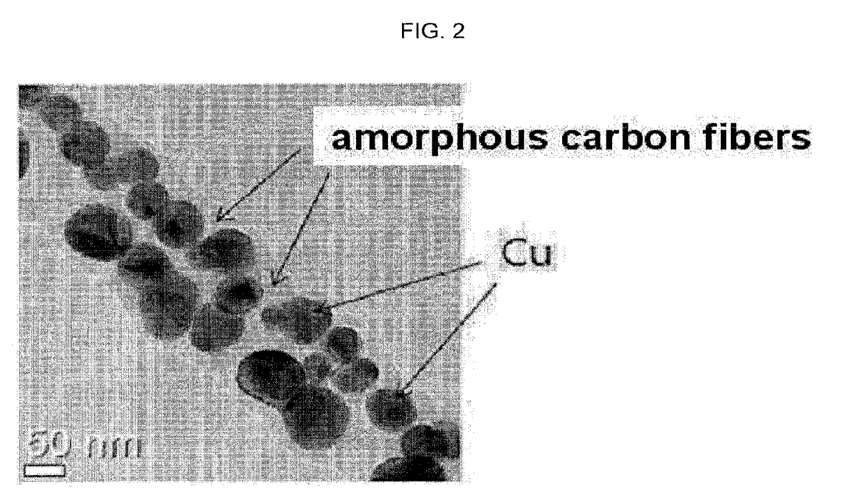
FIG. 2 is a transmission electron microscopy (TEM) image of amorphous carbon nanofibers including copper nanoparticles of a first example.

FIG. 2 is a transmission electron microscopy (TEM) image of amorphous carbon nanofibers including copper nanoparticles of the first example. As shown in FIG. 2, regions of fine copper nanoparticles are distinctively separated from regions of amorphous carbons. It could be observed that copper nanoparticles prepared from a copper salt through a thermal treatment at a reduction atmosphere were distributed with a size of 25~80 nm. In the first example, the thermal treatment was performed by using a forming gas (reduction atmosphere). Introduction of oxygen during a high temperature thermal treatment directly influences on oxidation of copper. Therefore, it is important to minimize introduction of oxygen. If nanofibers consist of pure copper particles after a thermal treatment, additional oxidation of copper occurs while the nanofibers are exposed to the atmospheric air. This may cause a thin film such as CuO or $Cu_2O$ to be formed on the surfaces of the copper particles. This oxide film drastically degrades an electrical conductivity of copper. Accordingly, required is a technique for preventing formation of a thin oxide layers on the surface of copper nanoparticles.

The present invention is advantageous in that additional oxidation of copper nanoparticles is prevented by amorphous carbons, and a dispersion characteristic between particles after a super-fine grinding is more enhanced.

Example 2: Preparation of Amorphous Carbon Nanofibers Having Increased Amount of Copper Nanoparticles In the second example, the same preparation processes as those of the first example were performed except that an amount of a copper precursor was increased to 1.2 g in order to form a larger amount of copper nanoparticles in amorphous carbon nanofibers.

Figure 3:
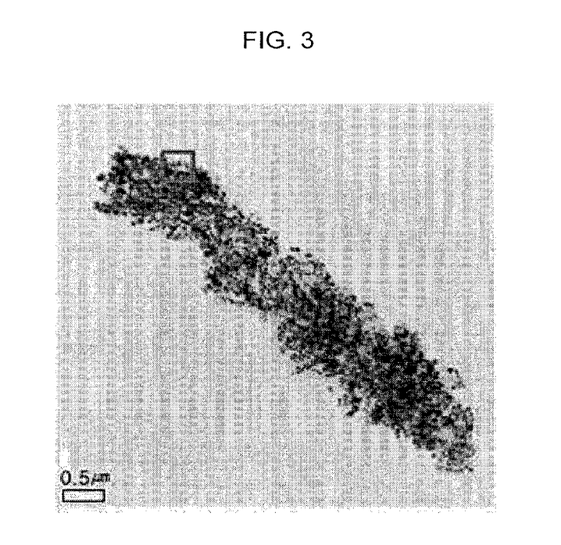
FIG. 3 is a transmission electron microscopy (TEM) image of amorphous carbon nanofibers including copper nanoparticles of a second example.
Figure 4:
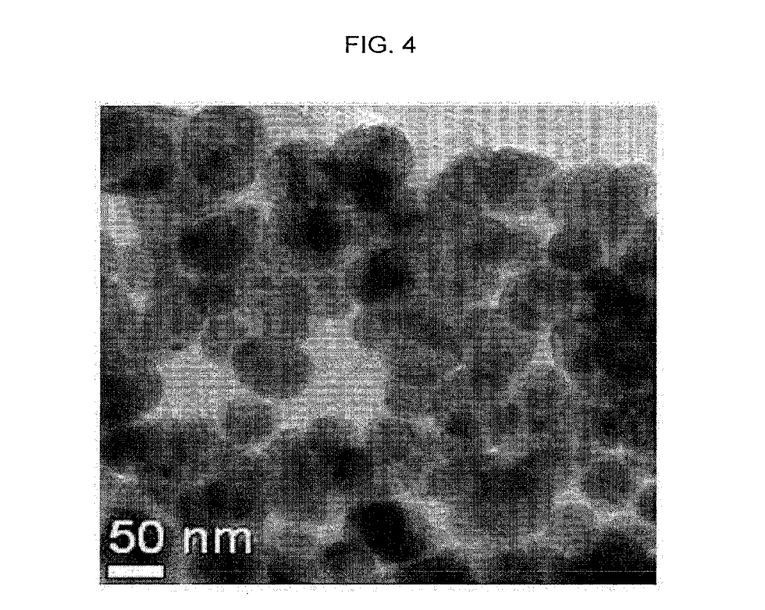
FIG. 4 is an enlarged transmission electron microscopy (TEM) image of FIG. 3.
Figure 5:
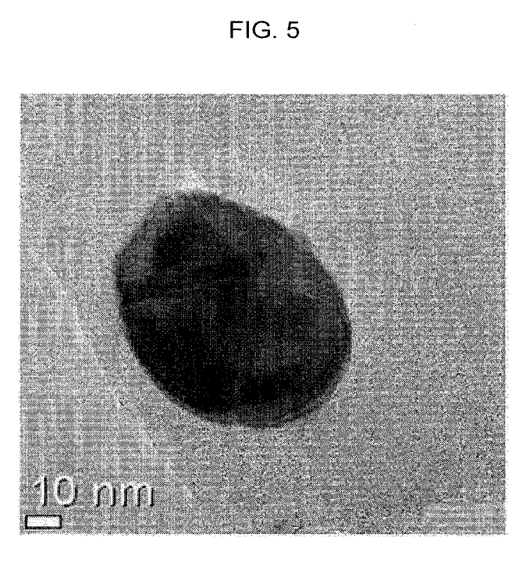
FIG. 5 is an enlarged transmission electron microscopy (TEM) image of one copper particle of FIG. 4.
Figure 6:
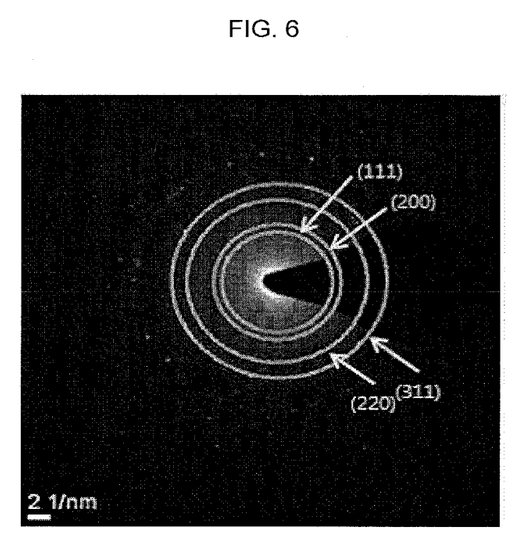
FIG. 6 is an electron beam diffraction pattern of amorphous carbon nanofibers including copper nanoparticles.

FIG. 3 is a transmission electron microscopy (TEM) image of amorphous carbon nanofibers including copper nanoparticles prepared by thermal treatment of the composite nanofibers prepared after the spinning process at a reduction atmosphere (a mixture gas of 20% hydrogen and 80% nitrogen) at a temperature of 550° C. for 60 minutes. When compared with the carbon nanofibers of the first example, copper particles were distributed more densely. Furthermore, it could be observed that a diameter of carbon nanofibers was increased to 150~600 nm as the amount of a copper salt was increased. Due to the increased amount of the copper salt, a nucleation site was increased, and a larger number of nanoparticles were distributed in amorphous carbon nanofibers. FIG. 4 is an enlarged transmission electron microscopy (TEM) image of FIG. 3, which shows that copper nanoparticles having a size of 25~80 nm were well formed in amorphous carbon nanofibers. FIG. 5 is an enlarged transmission electron microscopy (TEM) image of one copper particle of FIG. 4, which shows that copper nanoparticles having a size of 60 nm, approximately were well formed. As shown in FIG. 5, regions of amorphous carbon nanofibers and regions of copper nanoparticles were distinctively separated from each other. Furthermore, from a diffraction pattern of FIG. 6 obtained during TEM analysis, diffraction ring patterns of (111), (200), (220) and (311) were distinctively observed. From this observation, it could be checked that prepared nanoparticles were pure copper.

Example 3: Preparation of Amorphous Carbon Nanofibers Including Copper-Nickel Alloy Nanoparticles In order to control a size of copper particles which exist inside amorphous carbon nanofibers, a little amount of Ni having a higher melting point (1455° C.) than copper (1084° C.) is added to prepare copper-nickel alloy nanoparticles. In order to prepare amorphous carbon nanofibers including copper-nickel alloy nanoparticles, a copper precursor ($CuSO_4.4H_2O$) and a nickel precursor, $NiSO_4.6H_2O$ were put in 100 ml of a flask, thereby preparing a $Cu_{0.9}Ni_{0.1}$ alloy where a mol ratio between copper and nickel is 9:1. And, the amount of nickel was increased to prepare a $Cu_{0.85}Ni_{0.15}$ alloy. A total amount of the precursors was 1 g. The copper precursor and the nickel precursor were dissolved in 8 g of DMF, and 1 g of polyvinylpyrrolidone (PVP, Mw=1,300,000) was added to the mixture, thereby preparing a spinning solution. This spinning solution serves as a copper precursor-nickel precursor-polymer composite spinning solution. This copper precursor-nickel precursor-polymer composite spinning solution was put in 20 ml of a syringe, and then was discharged through a needle (30 G) at a speed of 10 μl/min. A voltage difference for spinning was in the range of 13~25 kV. As a collector, a metallic substrate formed of stainless steel (SUS) was used. Through control of a discharge amount, a thickness of a composite fibrous layer (web) was controlled.

The composite nanofibers prepared after the spinning process were thermally calcined at a reduction atmosphere (a mixture gas of 20% hydrogen and 80% nitrogen) at a temperature of 550° C. for 60 minutes.

Figure 7:
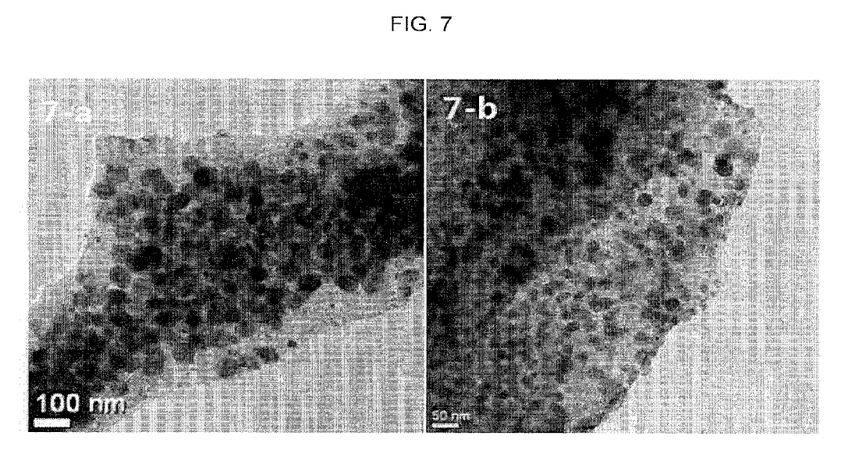
FIG. 7 is a transmission electron microscopy (TEM) image of amorphous carbon nanofibers including $Cu_{0.9}Ni_{0.1}$ alloy nanoparticles of a third example.

FIG. 7 is a transmission electron microscopy (TEM) image of amorphous carbon nanofibers including copper-nickel ($Cu_{0.9}Ni_{0.1}$) alloy nanoparticles prepared after a thermal treatment. FIG. 7 shows that a large amount of nanoparticles having a small size of 20~87 nm were distributed as Ni had been added. This may result from that excessive particle growths were prevented by nickel component having a high melting point had been added. Alternatively, this may result from that excessive particle growths were prevented as nickel had served as a catalyst while copper is reduced to form cores.

Figure 8:
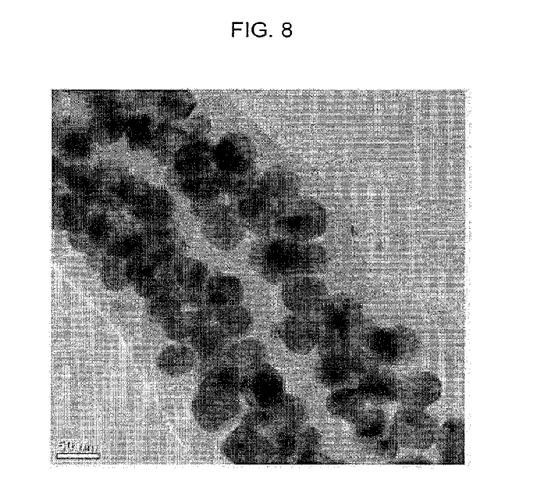
FIG. 8 is a transmission electron microscopy (TEM) image of amorphous carbon nanofibers including $Cu_{0.85}Ni_{0.15}$ alloy nanoparticles of a third example.

FIG. 8 is a transmission electron microscopy (TEM) image of amorphous carbon nanofibers including $Cu_{0.85}Ni_{0.15}$ alloy nanoparticles where the amount of nickel was increased. Referring to FIG. 8, regions of alloy nanoparticles were distinctively separated from regions of amorphous carbon nanofibers, and particles were distributed more uniformly with a size of 40~60 nm.

In this example, the metal having a higher melting point than copper was implemented as nickel (Ni), and 10 mol % and 15 mol % alloys were prepared. However, the present invention is not limited to the specific metal (Ni) as a metal having a higher melting point than copper.

Example 4: Preparation of Porous Amorphous Carbon Nanofibers Including Copper Nanoparticles In order to prepare porous amorphous carbon nanofibers including copper nanoparticles and a plurality of fine pores, 1 g of a copper precursor, $CuSO_4 \cdot 4H_2O$ was put in a solvent, 8 g of DMF inside 100 ml of a flask, thereby preparing a solution where the copper precursor is dissolved. Then, 0.001 g of carbon black was added to 1 g of polyvinylpyrrolidone (PVP, Mw=1,300,000), thereby preparing a spinning solution. This spinning solution serves as a copper precursor-carbon particles-polymer composite spinning solution. This copper precursor-carbon particles-polymer composite spinning solution was put in 20 ml of a syringe, and then was discharged through a needle (30 G) at a speed of 10 μl/min. A voltage difference for spinning was in the range of 13~25 kV. As a collector, a metallic substrate formed of stainless steel (SUS) was used. Through control of a discharge amount, a thickness of a composite fibrous layer (web) was controlled.

The composite nanofibers prepared after the spinning process were calcined at a reduction atmosphere (a mixture gas of 20% hydrogen and 80% nitrogen) at a temperature of 550° C. for 60 minutes.

Figure 9:
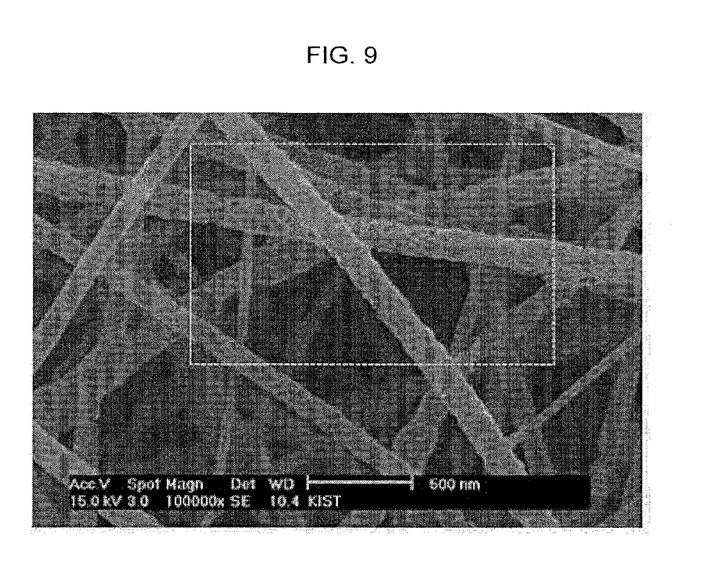
FIG. 9 is a scanning electron microscopy (SEM) image of porous amorphous carbon nanofibers including copper nanoparticles of a fourth example and a plurality of fine pores.

FIG. 9 is a scanning electron microscopy (SEM) image of porous amorphous carbon nanofibers including copper nanoparticles prepared after a thermal treatment and including a plurality of fine pores. FIG. 9 shows that nanofibers having a diameter of 100~250 nm have been well formed. These nanofibers have been entangled with each other in a web shape.

Figure 10:
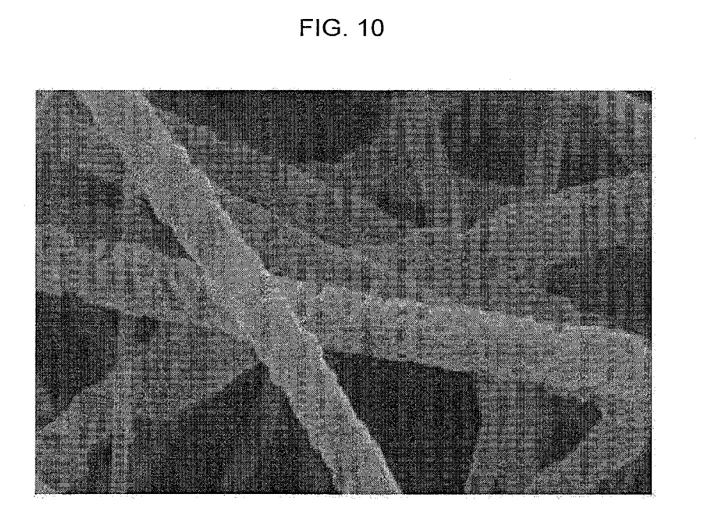
FIG. 10 is an enlarged scanning electron microscopy (SEM) image of a dotted part of FIG. 9.
Figure 11:
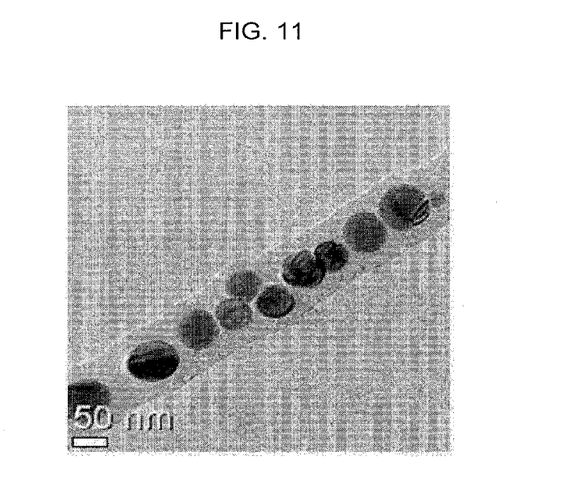
FIG. 11 is a transmission electron microscopy (TEM) image of porous amorphous carbon nanofibers including copper nanoparticles of a fourth example and a plurality of fine pores.

FIG. 10 is an enlarged scanning electron microscopy (SEM) image of a dotted part of FIG. 9, which shows that fine pores have been formed on the surfaces of nanofibers. The reason is because carbon particles added to a spinning solution leave pores while being decomposed to be removed during a thermal treatment at a reduction atmosphere. These carbon particles are removed in the form of $CO_2$ while being decomposed at a high temperature. Accordingly, oxygen which may remain at the periphery of copper nanoparticles is additionally removed, thereby preparing pure metallic copper nanoparticles without CuO or $Cu_2O$ phases. Furthermore, FIG. 10 shows copper nanoparticles having a smaller size than those of nanofibers having no carbon particles. FIG. 11 is a transmission electron microscopy (TEM) image of porous amorphous carbon nanofibers including a plurality of fine pores and copper nanoparticles, which shows a particle size of 40~60 nm.

Example 5: Preparation of Amorphous Carbon Nanofibers Including Copper Nanoparticles Prepared by Using Composite Polymers (PVP-PMMA)

The same preparation processes as those of the first example were performed except that copper precursor-polymer composite nanofibers were prepared by using composite polymers of 30 wt. % PVP (having a molecular amount of 1, 300,000) and 70 wt. % PMMA (having a molecular amount of 500,000). The composite nanofibers prepared after the spinning process were thermally processed at a reduction atmosphere (a mixture gas of 20% hydrogen and 80% nitrogen) at a temperature of 550° C. for 60 minutes.

Figure 12:
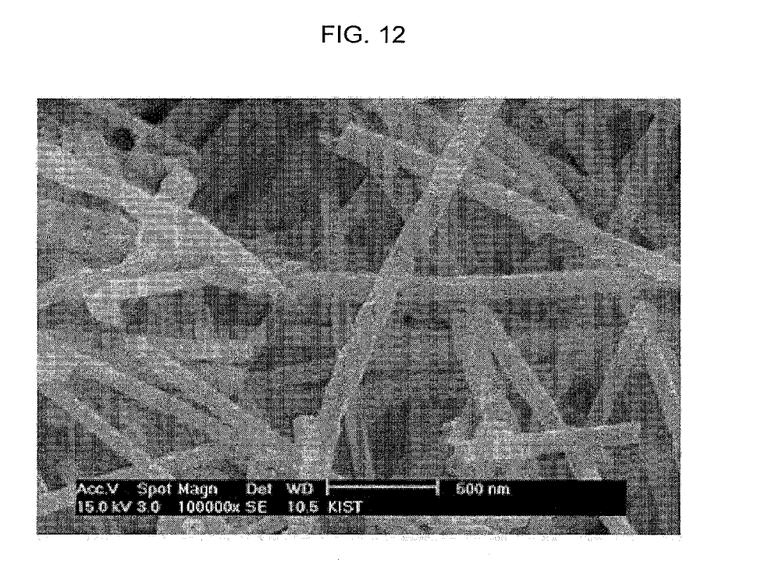
FIG. 12 is a scanning electron microscopy (SEM) image of amorphous carbon nanofibers including copper nanoparticles prepared by using PVP-PMMA composite polymers of a fifth example.
Figure 13:
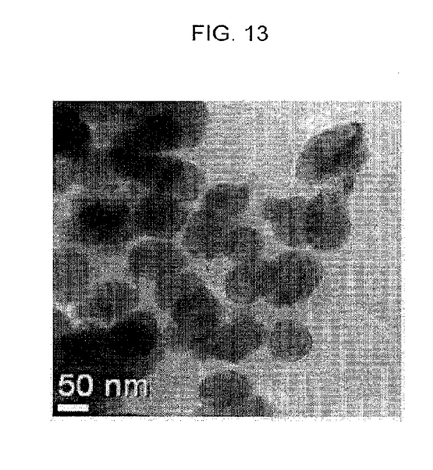
FIG. 13 is a transmission electron microscopy (TEM) image of amorphous carbon nanofibers including copper nanoparticles prepared by using PVP-PMMA composite polymers of a fifth example.

FIG. 12 is a scanning electron microscopy (SEM) image of amorphous carbon nanofibers including copper nanoparticles prepared by using composite polymers (PVP-PMMA), which shows that nanofibers having a size of 200 nm have been uniformly formed. The polymer, PVP having a molecular amount of 1, 300,000 is different from the polymer, PMMA having a molecular amount of 500,000. As the polymers having different molecular amounts are mixed with each other, chains of the polymers are distributed more densely. Accordingly, firm composite fibers having a uniform thickness are implemented. Since the amorphous carbon nanofibers having copper nanoparticles by being thermally-calcined are prepared from the composite fibers, the amorphous carbon nanofibers may have a very uniform thickness. FIG. 13 is a transmission electron microscopy (TEM) image of the amorphous carbon nanofibers prepared in the fifth example, which shows that copper nanoparticles having a size of 50~80 nm have been uniformly formed.

Figure 14:
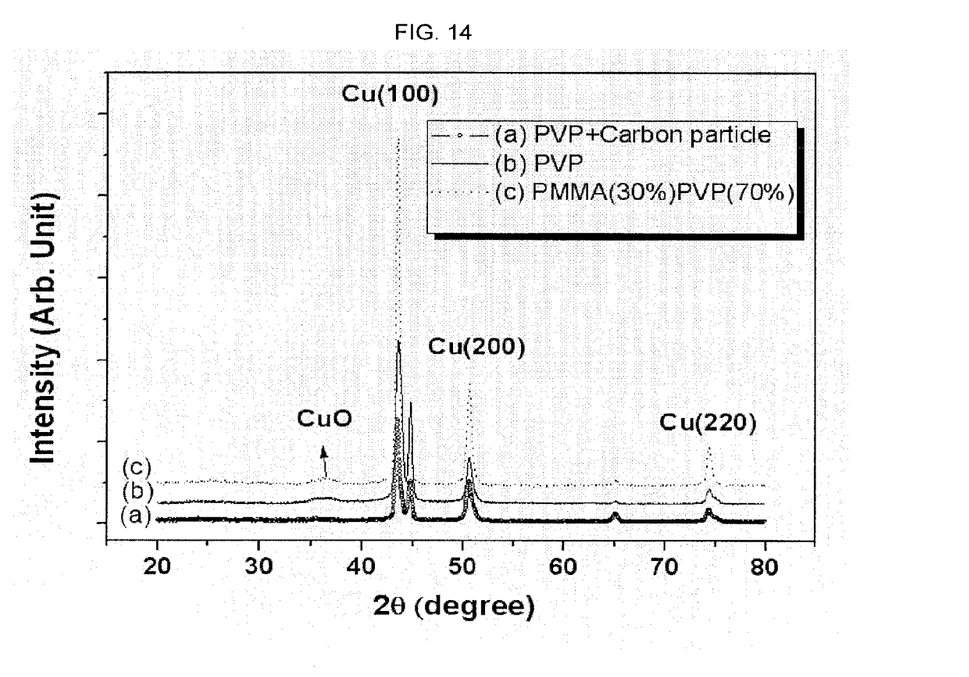
FIG. 14 is a graph showing an X-ray diffraction pattern result of amorphous carbon nanofibers including copper nanoparticles according to the present invention.

FIG. 14 is a graph showing an X-ray diffraction result of amorphous carbon nanofibers including copper nanoparticles prepared according to the present invention. The amorphous carbon nanofibers including copper particles and prepared through a thermal treatment at a reduction atmosphere showed a diffraction characteristic of monocrystalline copper. Especially, in case of amorphous carbon nanofibers including carbon particles (a), no peak of CuO was observed at approximate 37°. When considering that the amorphous nanofibers including copper particles were kept in the air for 48 hours or more and then underwent an X-ray diffraction analysis, the copper particles were not oxidized due to the formation of carbon shells on copper nanoparticles. Through the X-ray diffraction result, it could be observed that crystalline copper particles had been formed very well in amorphous carbon nanofibers including copper particles prepared by using a PVP polymer (b) and PVP-PMMA composite polymers (c) each including no carbons.

The amorphous carbon coating layer may be removed by a thermal treatment at a high temperature. Preferably, the amorphous carbon coating layer may be easily removed by a laser-sintering or intense pulsed light (IPL) sintering process using a xenon lamp which is a technology aimed at producing light of high intensity during a very short period of time. Accordingly, a copper thin film having an excellent electrical conductivity may be implemented without damaging a plastic substrate.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. Amorphous carbon nanofibers comprising: nanoparticles having a copper component;
   wherein said nanoparticles are distributed inside the amorphous carbon nanofibers, and
   regions of the nanoparticles are separated from regions of amorphous carbons.

2. The amorphous carbon nanofibers of claim 1, wherein the nanoparticles having copper component are copper nanoparticles or copper alloy nanoparticles.

3. The amorphous carbon nanofibers of claim 2, wherein the copper alloy is an alloy of copper and a metal having a higher melting point than the copper.

4. The amorphous carbon nanofibers of claim 2, wherein the copper alloy is represented by $Cu_{1-x}M_x$, wherein the 'M' indicates one or more metals selected from a group consisting of Ni, Cr, Co, Fe, W and Ti, and the 'X' is in the range of 0.01~20.

5. The amorphous carbon nanofibers of claim 1, wherein the nanoparticles having copper component have a size of 2~100 nm.

6. The amorphous carbon nanofibers of claim 1, wherein the amorphous carbon nanofibers are porous amorphous carbon nanofibers having a pore size of 1~100 nm.

7. The amorphous carbon nanofibers of claim 1, wherein the amorphous carbon nanofibers have a diameter of 50~3000 nm.

8. Copper composite nanoparticles, wherein the copper composite nanoparticles are nanoparticles including copper component whose surfaces are partially or wholly coated with amorphous carbons.

9. The copper composite nanoparticles of claim 8, wherein the copper composite nanoparticles have a size of 2~100 nm.

10. The copper composite nanoparticles of claim 8, wherein the nanoparticles including copper component are copper nanoparticles, or copper alloy nanoparticles represented by $Cu_{1-x}M_x$ (the 'M' is one or more metals selected from a group consisting of Ni, Cr, Co, Fe, W and Ti, and the 'X' is in the range of 0.01~20).

* * * * *